United States Patent [15] 3,648,547
Schwerdhofer [45] Mar. 14, 1972

[54] AUTOMATICALLY SHIFTING, THREE-SPEED BICYCLE HUB

[72] Inventor: Hans Joachim Schwerdhofer, Schweinfurt am Main, Germany

[73] Assignee: Fichtel & Sachs AG, Schweinfurt am Main, Germany

[22] Filed: Dec. 2, 1970

[21] Appl. No.: 94,228

[52] U.S. Cl. .......................................................... 74/752 E
[51] Int. Cl. ........................................................ F16h 5/42
[58] Field of Search ...................... 74/752 E, 750 B; 192/6 A

[56] References Cited

UNITED STATES PATENTS

| | | | |
|---|---|---|---|
| 3,438,283 | 4/1969 | Schwerdhofer | 74/752 E X |
| 3,492,892 | 2/1970 | Shimano et al. | 74/752 E |
| 3,492,893 | 2/1970 | Shimano et al. | 74/752 F |

*Primary Examiner*—Arthur T. McKeon
*Attorney*—Kelman and Berman

[57] ABSTRACT

In a three-speed bicycle hub, overrunning pawl-and-ratchet clutches respectively connect the hub shell to the driver and to the ring gears of two sets of planetary gearing whose planet gears are mounted on a common planet carrier fixed to or integral with the driver. The clutches between the ring gears and the hub shell are controlled by centrifugal governors.

10 Claims, 6 Drawing Figures

INVENTOR.
Hans Joachim Schwerdhöfer
BY: Kelman and Berman
AGENTS

AUTOMATICALLY SHIFTING, THREE-SPEED BICYCLE HUB

This invention relates to multiple-speed hubs for bicycles and like vehicles, and particularly to a hub which provides three transmission ratios between the driver or input member of the hub and the hub shell, and whose transmission ratio is shifted automatically by clutch controls operating two of the three clutches adapted to connect respective sets of planetary gears or the driver to the hub shell.

In a known hub of the general type described, torque is transmitted directly from the driver to the hub shell at the second or intermediate speed or transmission ratio, and planetary gearing transmits torque both at the lowest and at the highest speed. Most pedaling power is normally required when the hub is operating at low speed, and the friction losses in the known arrangement are significantly higher in low speed than in second speed because of the planetary gearing interposed between the driver and the hub shell. Moreover, the known apparatus is complex and correspondingly bulky.

Among the objects of this invention is the provision of an automatically controlled three-speed hub in which torque is transmitted directly from the driver to the hub shell at the lowest speed for a minimum of friction losses, and which is simple and compact.

With these and other objects in view, as will hereinafter become apparent, the invention provides an improvement in a hub in which the transmission operatively interposed in the hub shell between the latter and the driver includes two sets of planetary gears, each set including a sun gear, a planet gear, and a ring gear, the planet gear in each set being meshingly connected to the sun gear and the ring gear, and in which three clutches are interposed between the hub shell and, respectively, the two sets of gears and the driver. Two of the clutches are operated automatically in response to a change in the rotary speed of the driver or the hub shell.

According to this invention, the planet gears of the two sets are mounted on a common planet carrier for movement therewith about the hub axis, and the ratio between the pitch diameters of the sun gear and the ring gear is different in the two sets of planetary gears.

It is generally preferred that the ring gears differ in pitch diameter whether the two sets have separate sun gears or share a sun gear which meshes with the planet gear of one set, the planet gears of both sets being connected by motion transmitting means for joint rotation.

The automatically operated clutches in preferred embodiments are interposed between the ring gears of respective sets and the hub shell, and controlled by respective centrifugal governors, each governor including a flyweight rotatable about the hub axis and movable radially relative to the axis, so that the flyweight may move radially under centrifugal forces or under the force of a return spring when rotated by a drive connection to the hub shell or to the driver, and thereby cause clutch operation, as is known in itself.

An automatically operated clutch may include a ratchet on the hub shell and a cooperating pawl mounted on the ring gear together with the associated flyweight. Conversely, the ratchet may be secured to the ring gear for joint rotation, and the pawl mounted on the hub shell when the flyweight drive is derived from the hub shell.

In order to make best possible use of the limited available space, it is preferred to mount one of the ring gears on the shaft and to journal the other ring gear in the hub shell. A further saving in space is possible when one of the clutches and the associated centrifugal governor are mounted in an annular space radially bounded by the two ring gears.

Other features and many of the attendant advantages of this invention will be appreciated readily as the same becomes better understood by reference to the following detailed description of preferred embodiments when considered in connection with the accompanying drawing in which.

Figure 1:
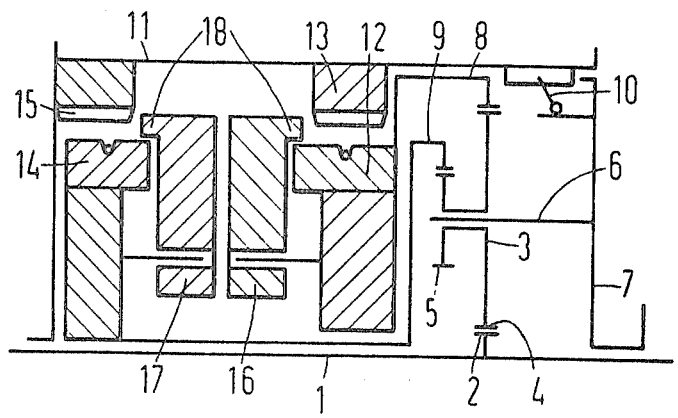
FIG. 1 shows a three-speed bicycle hub of the invention in axial section by conventional symbols.
Figure 2:
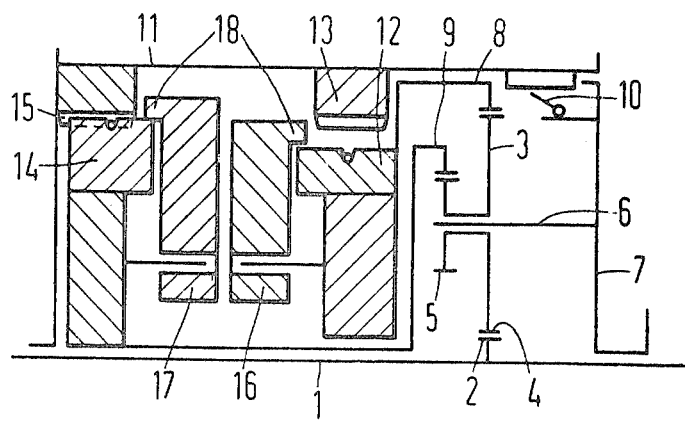
FIGS. 2 and 3 show the hub of FIG. 1 set for different transmission ratios.
Figure 3:
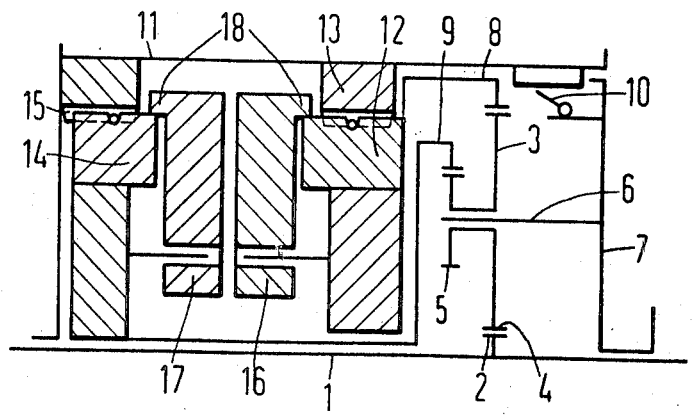

Referring now to the drawing in detail, and initially to FIGS. 1 to 3, there is seen the shaft 1 of a bicycle hub which is normally fixedly mounted in the bicycle frame, and stationary relative to the frame. A sun gear 2 is cut into or otherwise fixed on the shaft 1. A planet 3 having two gear rims 4,5 of different diameters meshes with the sun gear 2 by means of its rim 4. The planet is rotatably mounted on a shaft 6 attached to a driver 7 which also serves as a common planet carrier for the two sets of planetary gears respective constituted by the common sun gear 2, the planet gear rims 4,5, and two ring gears 8,9 in meshing engagement with the rims 4,5 respectively.

Figure 6:
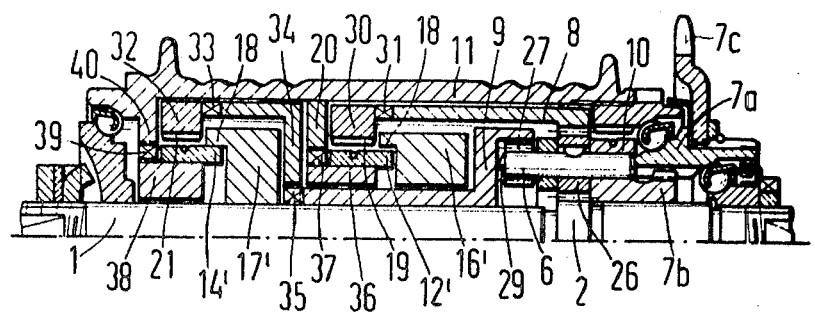
FIG. 6 is an axially sectional view of one half of an actual embodiment of the hub diagrammatically illustrated in FIG. 4.

An overrunning pawl-and-ratchet clutch 10 provides a freewheeling drive connection between the driver 7 and the hub shell 11, the driver being fixedly fastened to a sprocket for the drive chain of the bicycle in the usual manner as will be shown in FIG. 6. As shown in FIG. 1, torque is transmitted directly from the driver 7 to the hub shell 11 by the overrunning clutch 10.

The ring gear 8 carries a pawl 12 biased toward engagement with a ratchet rim 13 on the inner wall of the hub shell 11 by a pawl spring, as is conventional, to constitute a second clutch, and a third clutch is formed by a similar pawl 14 on the ring gear 9 which may cooperate with a ratchet rim 15 on the hub shell. As shown in FIG. 1, the pawls 12,14 are held out of engagement with the associated ratchet rims 13,15 by two flyweights 16,17 pivotally mounted on the ring gears 8,9 respectively for rotation with the ring gears about the hub axis, and for radial movement of their centers of gravity under centrifugal forces capable of overcoming respective return springs, conventional and not specifically illustrated, which bias each flyweight toward the axis of rotation. Respective actuating lugs 18 on the flyweights 16,17 engage the pawls 12,14 in the hub condition illustrated in FIG. 1 to disengage the second and third clutch.

The return springs are so chosen that the clutch constituted by the pawl 14 and the ratchet rim 15 is engaged first when the rotary speed of the driver is increased so that, as shown in FIG. 2, torque is transmitted from the driver 7 to the hub shell 11 by the ring gear 9 whose pitch diameter is smaller than that of the ring gear 8, a corresponding pitch diameter ratio existing between each of the two ring gears and the common sun gear 2. The hub shell 11 is driven at the intermediate or second speed of the hub which is higher than the direct speed of FIG. 1, and the clutch 10 idles.

Upon further increased pedaling speed reflected in a yet higher rotary speed of the driver 7, the flyweight 16 can overcome the restraint of its nonillustrated return spring and releases the pawl 12, as shown in FIG. 3, whereby torque is transmitted at the highest available transmission ratio from the driver 7 to the hub shell 11 by the pawl 12 and the ratchet rim 13, and the ratchet rim 15 overruns the slower moving pawl 14.

Many of the elements in the hub of FIGS. 1 to 3 may be interchanged or connected in a different manner without significantly changing the mode of operation. In the modified hub seen in FIG. 4, the pawls 12', 14' of the automatically controlled clutches are mounted respectively on a radial flange 20 on the hub shell 11 and on a radial end wall of the hub shell for engagement with ratchet rims 19,21 on the ring gears 8,9. The flyweights 16,17 of the centrifugal governors are pivotally mounted on the same elements which carry the associated pawls. The hub of FIG. 4 is otherwise identical with that described above with reference to FIGS. 1 to 3 and operates in an analogous manner.

Figure 4:
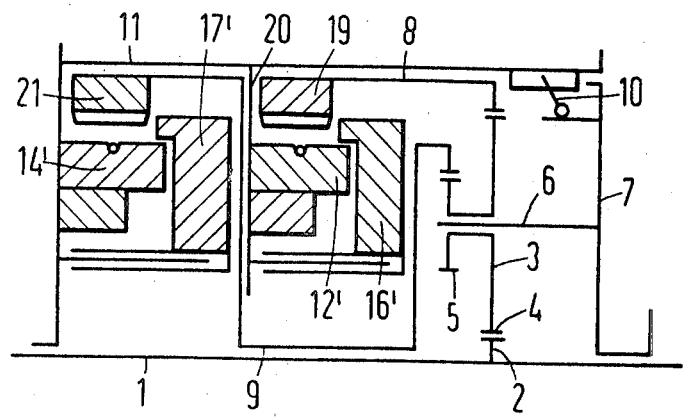
FIG. 4 shows a first modification of the hub of FIGS. 1 to 3.
Figure 5:
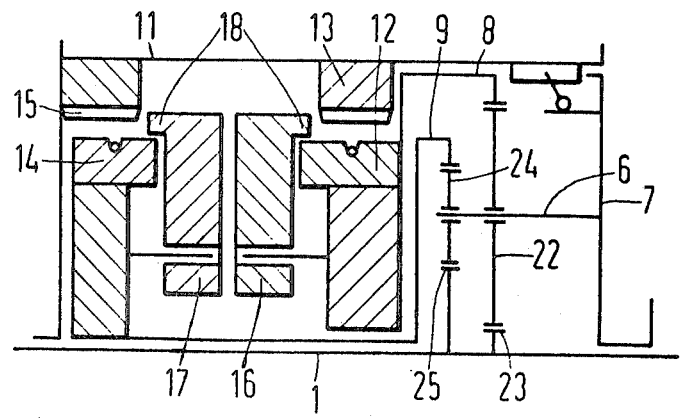
FIG. 5 illustrates another modification of the same hub.

Further modifications are available in the cooperation between the planet gears of the two sets of planetary gears and the associated sun gear or gears, as shown in FIG. 5 in combination with the clutches of FIGS. 1–3, the same sun gear modification being obviously applicable to the device of FIG. 4. The planet shaft 7 rotatably carries a planet gear 22 of the first set which simultaneously meshes with internal gear teeth on the ring gear 8 and with a sun gear 23 fixed on the shaft 1. The planet gear 24 of the second set also freely rotates on the shaft 6 and meshes simultaneously with the ring gear 9 and another fixed sun gear 25 on the shaft 1.

While only one planet gear has been shown in meshing engagement with each ring gear, and only one pawl cooperates with each ratchet, as far as is seen in the drawing, more than one planet gear is normally provided, and more than one pawl normally cooperates with an associated ratchet in each of the three clutches employed, as is well known in itself. Similarly, more than one flyweight normally cooperates with each set of pawls, and other variations will be obvious to those skilled in the art. In the embodiments illustrated in FIGS. 1 to 4, two planet gears are fixedly connected for rotation about a common axis of a planet shaft, but the independent planet gears 22, 24 shown in FIG. 5 need not be coaxial and need not be mounted on a common shaft although such an arrangement is preferred for reasons of convenience and low cost.

An actual embodiment of the hub diagrammatically illustrated in FIG. 4 is shown in FIG. 6.

The sun gear 2 is cut into the shaft 1. The driver consists of an input portion 7a mounted on the shaft by means of a ball bearing and supporting one axial end of the hub shell 11 by means of another ball bearing, and a planet carrier portion 7b splined to the portion 7a and providing a bearing for a planet shaft 6. A sprocket 7c is fixedly fastened to the driver portion 7a, which also carries the pawl of the overrunning clutch 10. Two planet gears 26,27 are fixedly fastened to the shaft 6 and meshingly engage the ring gears 8,9 respectively. The free axial end 29 of the shaft 6 tapers to a rounded point which abuttingly engages an annular, radial wall portion of the ring gear 9 for securing the axial position of the shaft in cooperation with a similar wall on the driver portion 7a.

The aforementioned radial wall portion connects the internal gear teeth of the ring gear 9 with a sleeve portion which is freely rotatable on the shaft 1 and axially terminates in teeth 35 interengaged with radially directed teeth in a bottom aperture of a cup-shaped element 34. Similar axial teeth 33 about the rim of the element 34, which is a fixed part of the ring gear 9 in the illustrated assembled condition of the hub, are interengaged with corresponding teeth on a ring 32 provided with the ratchet rim 21. An annular radial end wall 40 of the hub shell 11 is fixedly connected by interengaged teeth 39 with a ring 38 about the shaft 1. A pawl 14′ is pivotally mounted on the ring 38 for engagement with the ratchet rim 21. In the low speed position of the hub illustrated in FIG. 6, the pawl 14′ is held out of engagement with the ratchet rim 21 by the actuating lug 18 on the flyweight 17′, a portion of the flyweight not visible in FIG. 6 being pivoted on the ring 38.

The ring gear 8 is a relatively long tube journaled in contact with the hub shell 11 and carrying its internal gear rim at one axial end in a common plane with the planet gear 26. Axial teeth 31 on the other axial end couple the ring gear 8 to an annular member 30 provided with the ratchet rim 19. A fixed radial flange 20 on the hub shell 11 extends between the annular member 30 and the bottom of the cup-shaped element 34 and is fixedly coupled to a ring 36 by interengaged teeth 37. The ring 36 carries the pawl 12′ which engages the ratchet rim 19 when not held in the illustrated disengaged position by the actuating lug 18 on the flyweight 16′, the latter being pivotally mounted on the ring 36 in a manner not shown, but conventional.

The clutch constituted by the pawl 12′ and the ratchet rim 19, the flyweight 16′, and the drive ring 36 which causes rotation of the flyweight are thus installed in an annular space radially bounded by the sleeve portion of the ring gear 9 and by the ring gear 8. The diameter of the hub shell 11 is quite small therefore, as compared to known three-speed hubs with automatic speed change.

The hub more specifically illustrated in FIG. 6 and the modifications and variations of the same evident from FIGS. 1 to 5 provide direct torque transmission from the driver to the hub shell in the lowest transmission ratio, and thus without the small, but significant frictional power losses inherent in torque transmission through stressed gears. No power is lost in the idling gears when the pawls 12,12′, 14,14′ are disengaged from the associated ratchets. The hubs of the invention are simple, as is evident from the drawing, and may be assembled in a simple manner obvious to those familiar with this art from FIG. 6 without detailed description.

It should be understood, of course, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. In a multiple-speed hub for a bicycle and like vehicle having a shaft, a hub shell member and a driver member mounted on said shaft for rotation about a common axis, and transmission means operatively interposed in said hub shell member between said members for transmitting torque therebetween at each of three different transmission ratios, said transmission means including two sets of planetary gears, each set including a sun gear, a planet gear, and a ring gear, the planet gear in each set being meshingly connected to the sun gear and the ring gear, three clutches interposed between said driver member and said sets respectively and said hub shell member, and clutch control means for operating two of said clutches in response to a change in the rotary speed of one of said members, the improvement which comprises:

a. a planet carrier rotatable about said axis, the planet gears of said two sets being mounted on said planet carrier for movement therewith about said axis, b. the ratio between the pitch diameters of the sun gear and the ring gear being different in said two sets.

2. In a hub as set forth in claim 1, the pitch diameter of the ring gear in one set being greater than the pitch diameter of the ring gear in the other set.

3. In a hub as set forth in claim 2, a single sun gear common to said two sets and meshingly engaging the planet gear of one of said sets, and motion transmitting means connecting the planet gears of said two sets for joint rotation.

4. In a hub as set forth in claim 1, said clutch control means including two centrifugal governors, each governor including a flyweight rotatable about said axis and movable radially relative to said axis, drive means interposed between one of said members and the flyweight for rotating the flyweight, and actuating means for operating a respective clutch in response to radial movement of the flyweight, the clutches operated by said actuating means being operatively interposed between said hub shell member and respective ring gears of said sets.

5. In a hub as set forth in claim 4, one of said operated clutches including a ratchet on said hub shell member and a pawl adapted to engage the ratchet, said pawl and the associated flyweight being mounted on the associated ring gear.

6. In a hub as set forth in claim 4, one of said operated clutches including a ratchet secured to the associated ring gear for joint rotation and a pawl mounted on said hub shell member, said drive means being operatively interposed between said hub shell member and the flyweight associated with said one clutch.

7. In a hub as set forth in claim 1, the ring gear of one of said sets being rotatably mounted on said shaft, the ring gear of the other set being journaled in said hub shell member.

8. In a hub as set forth in claim 7, said ring gears radially bounding an annular space about said axis in an inward and outward direction respectively, one of the clutches operated by said clutch control means and a portion of the control means being arranged in said space, said portion including a flyweight rotatable about said axis and movable radially relative to said axis, drive means interposed between one of said members and said flyweight for rotating the same, and actuating means for operating said one clutch in response to radial movement of the flyweight.

9. In a hub as set forth in claim 1, the planet gears of said two sets being mounted on said planet carrier for rotation about a common axis spaced from the axis of rotation of said planet carrier.

10. In a hub as set forth in claim 1, said planet carrier being fixedly fastened to said driver member for rotation about said axis.

* * * * *

UNITED STATES PATENT OFFICE
CERTIFICATE OF CORRECTION

Patent No. 3,648,547          Dated March 14, 1972

Inventor(s) Hans Joachim Schwerdhofer

It is certified that error appears in the above-identified patent and that said Letters Patent are hereby corrected as shown below:

In the title page, insert the following lines:

/32/   Priority  Dec. 15, 1969

/33/             Germany

/31/             P 19 62 736.2

Signed and sealed this 29th day of August 1972.

(SEAL)
Attest:

EDWARD M. FLETCHER, JR.                ROBERT GOTTSCHALK
Attesting Officer                      Commissioner of Patents